UNITED STATES PATENT OFFICE.

ARTHUR W. TRENCH, OF BROOKLYN, NEW YORK, ASSIGNOR TO JOSEPH GLATZ, OF SAME PLACE.

PROCESS OF RECOVERING GLYCERINE FROM SPENT SOAP-LYES.

SPECIFICATION forming part of Letters Patent No. 399,028, dated March 5, 1889.

Application filed December 12, 1888. Serial No. 293,373. (No specimens.)

*To all whom it may concern:*

Be it known that I, ARTHUR W. TRENCH, a resident of Brooklyn, Kings county, New York, have invented an Improved Process for Recovering Glycerine from Spent Soap-Lyes, of which the following is a specification.

The object of my invention is to recover glycerine from spent soap-lyes; and the invention consists, mainly, in precipitating and coagulating the fatty, resinous, and albuminous matters contained in the lye by the use of the animal substance herein specified.

In carrying out my invention I use rennet, either in the natural state or in the form of rennetine or chymosin, to separate the albuminous matters and impurities from the glycerine in the soap-lye. If I use prepared rennetine or chymosin—for instance, such as described by Dr. Blumenthal in his patent, No. 344,433, dated June 29, 1886—I make a ten-per-cent. or about a ten-per-cent. solution of it in water. If I use the natural rennet, I take the rennet of the calf or other animal, and after cleaning I boil it up in a solution of muriatic acid (or any other suitable acid) and water for about two hours, the proportions being about one pound of rennet to ten pounds of water and one-half pound of acid, and then allow it to soak for, say, twelve hours. It is not necessary to keep up the heat during the soaking. I then filter the mass and use the clear liquor in my process.

I would have it understood that for the purposes of my invention the solution of natural rennet is the equivalent of the solution of rennetine or chymosin, because in either case I employ the active curdling element of the animal stomach. Having prepared this solution, I first run the spent soap-lye—say about six thousand pounds—into a suitable tank, preferably one lined with lead, and there neutralize with muriatic acid. I then add to the lye about thirty pounds of the solution of rennetine before mentioned. I now warm this mixture of lye and rennetine solution up to about 180° Fahrenheit, and allow it to stand until all, or nearly all, the albuminous matter, and also part of the fatty acids contained in the lye, is coagulated by the rennetine solution and precipitated. I now remove the precipitates by running the mixture through a filter-press or by drawing the clear liquor off the top, or otherwise. The clear liquor is next run into another tank, preferably one lined with lead, and sufficient muriatic or other acid is added—say from one-quarter to one-half pound of acid to each one hundred pounds of lye—to give the lye a distinct acid reaction to litmus-paper. This has the effect of precipitating the remaining fatty and resinous acids in the lye, while any remaining rennetine solution coagulates the fatty and resinous acids still in the lye. I now run the liquor through a filter-press or analogous device to remove the precipitates, or I remove them by any other suitable means. I next run the clear lye as above treated into another tank, preferably one lined with lead, and neutralize the lye with a suitable alkali. I prefer to have this last-mentioned tank connected with the filter-press, so that any remaining albuminous matter precipitated by the last step in the process may be conveniently removed. The lye as above treated I now evaporate to proper density, preferably under a vacuum, and obtain crude glycerine. The salt that crystallizes out of the lye solution during evaporation is removed from time to time and washed with some of the treated liquor as it stands before being passed to the evaporator, the liquor from said washings being passed into the evaporator. This washing of the salt removes a great part of glycerine which has adhered to the salt. The evaporation of the treated liquor should continue until glycerine is obtained having a density of about 1.3 specific gravity.

Having now described my invention, what I claim is—

1. In the process of extracting glycerine from spent soap-lye, the improvement which consists in adding to the lye rennet solution for coagulating and precipitating albuminous matter and fatty acids contained in said lye, substantially as described.

2. In the process of extracting glycerine from spent soap-lye, the improvement which consists in adding to the lye a rennet solution in acid, and afterward adding an acid to complete the precipitation of the albuminous matter and of the fatty and resinous acids contained in the lye, as specified.

ARTHUR W. TRENCH.

Witnesses:
GUSTAV SCHNEPPÉ,
HARRY M. TURK.